United States Patent
Franz

(10) Patent No.: US 8,328,255 B2
(45) Date of Patent: Dec. 11, 2012

(54) APPARATUS AND METHOD FOR TRANSFERRING SHOCK-SENSITIVE GLASS PLATES IN ULTRA CLEAN ROOMS

(75) Inventor: Roland Franz, Fuenfstetten (DE); Kornelia Ulrike Franz, legal representative, Fuenfstetten (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 34 days.

(21) Appl. No.: 12/739,940
(22) PCT Filed: Oct. 24, 2008
(86) PCT No.: PCT/DE2008/001737
§ 371 (c)(1), (2), (4) Date: Apr. 26, 2010
(87) PCT Pub. No.: WO2009/056102
PCT Pub. Date: May 7, 2009

(65) Prior Publication Data
US 2011/0171001 A1 Jul. 14, 2011

(30) Foreign Application Priority Data
Oct. 31, 2007 (DE) .................. 10 2007 052 182

(51) Int. Cl.
A47B 97/00 (2006.01)
B66C 1/02 (2006.01)
(52) U.S. Cl. .................. 294/65; 414/783
(58) Field of Classification Search ......... 294/64.1, 294/65, 87.1, 907, 183; 414/776, 783, 752.1
See application file for complete search history.

(56) References Cited

U.S. PATENT DOCUMENTS

| | | | |
|---|---|---|---|
| 3,541,597 A | 11/1970 | Segawa et al. | |
| 4,925,361 A | 5/1990 | Ellis et al. | |
| 5,160,181 A * | 11/1992 | Lykam et al. | 475/210 |
| 5,918,358 A * | 7/1999 | Ffield et al. | 29/559 |
| 6,352,402 B1 * | 3/2002 | Hwang et al. | 414/752.1 |
| 7,628,434 B2 * | 12/2009 | Bruce et al. | 294/65 |
| 8,070,203 B2 * | 12/2011 | Schaumberger | 294/183 |
| 2004/0160610 A1 * | 8/2004 | Miura | 356/512 |

FOREIGN PATENT DOCUMENTS

CA 955194 9/1974
(Continued)

Primary Examiner — Dean Kramer
Assistant Examiner — Stephen Vu
(74) Attorney, Agent, or Firm — Duane Morris LLP; J. Rodman Steele, Jr.; Gregory M. Lefkowitz

(57) ABSTRACT

Disclosed are a method and apparatus for the contamination-free transfer of thin, shock-sensitive crystalline plates, especially glass plates, from a horizontal into a defined vertical position. Said method and apparatus have the following features: a) a transverse bar of a transfer fork is disposed below the glass plate in order to grip the glass plate, said transverse bar (6) being fitted with suction head-supporting bars which are vertically mounted thereon and have suction heads that are distributed along the top side thereof and penetrate the free space between the rolls: b) the suction heads are moved close to the bottom side of the glass plate; and the suction elements thereof are connected to the glass plate by means of intake air, c) the glass plate is put into the placement device after being finely adjusted. Also disclosed are a computer program and a machine-readable carrier containing the corresponding program code.

7 Claims, 4 Drawing Sheets

FOREIGN PATENT DOCUMENTS

| | | |
|---|---:|---:|
| DE | 202007003907 | 3/2007 |
| EP | 1541296 | 6/2005 |
| EP | 1698575 | 9/2006 |
| FR | 2012911 | 3/1970 |
| FR | 2545815 | 11/1984 |
| JP | 10236636 A | 9/1998 |
| JP | 11035150 A | 2/1999 |
| JP | 11288097 A | 10/1999 |
| JP | 2003226425 A | 8/2003 |
| JP | 2006150538 A | 6/2006 |

* cited by examiner

APPARATUS AND METHOD FOR TRANSFERRING SHOCK-SENSITIVE GLASS PLATES IN ULTRA CLEAN ROOMS

CROSS-REFERENCE TO RELATED APPLICATIONS

This application is a §371 national stage entry of International Application No. PCT/DE2008/001737, filed Oct. 24, 2008, which claims priority to German Patent Application No. 10 2007 052 182.2, filed Oct. 31, 2007, both of which are hereby incorporated by reference.

BACKGROUND

Modern glass facades are an indisputable sign of modern architecture. However, in many cases they are not just a functional element of a structure, but in fact also serve increasingly for generating solar energy. Tailored solar modules make accurate integration into building grids and profiles possible. Semitransparent solar cells, but also opaque solar cells with transparent areas, make photovoltaic glazings appear to be flooded with light. Here, the solar cells often take on the desired effect of protection against the sun and glare.

The production of such photovoltaic systems requires operating conditions such as those which are conventional primarily in the production of semiconductors and integrated electronic circuits. However, in the production of photovoltaic systems, these so-called clean room conditions additionally make it necessary to handle shock-sensitive glass plates with a large surface area.

The production and further processing of shock-sensitive plates is also required in the production of large flat screens, and in a large quantity. Modern flat screens are increasingly replacing the old tube monitors, and are also becoming less and less expensive.

These are based on TFT/LCD technology. In this context, LCD (Liquid Crystal Display) represents the use of liquid crystals in the individual pixels of the screen, and TFT stands for Thin Film Transistor. The TFTs are very small transistor elements which control the orientation, and therefore the light transmission, of the liquid crystals.

A flat-screen display consists of numerous pixels. In turn, each pixel consists of 3 LCD cells (subpixels), corresponding to the colors of red, green and blue. A 15-inch screen (measured diagonally) contains about 800,000 pixels or roughly 2.4 million LCD cells. For understanding of the mode of operation:

A liquid crystal cell (LCD cell) works in a similar manner to polaroid sunglasses. If two polaroid glasses are held one above the other and then twisted with respect to each other, it is initially possible to see less and less and then nothing at all. This effect arises because polaroid glass is transparent only to light waves which vibrate in a specific plane. If two such glasses are held one above the other and twisted through 90° with respect to each other, some of the light can still pass through the first glass, but no longer through the second glass, since this is then transverse to the incoming light waves and filters them out.

An LCD cell works on the same principle. It consists of two polaroid glasses which are twisted through 90° with respect to each other and through which no light can therefore pass, in accordance with that explained above. A layer of liquid crystals, which has the natural property of turning the vibration plane of light, is located between these two polaroid glasses. This layer of liquid crystals is just thick enough that the light passing through the first polaroid glass is turned back through 90°, and can therefore also pass through the second polaroid glass, i.e. is visible to the viewer.

If the liquid crystal molecules are then turned away from their natural position by the application of an electrical voltage, less light passes through the cell and the corresponding pixel becomes dark. The corresponding voltage is produced by a TFT element which is part of every LCD cell. The light for the LCD display is produced in the rear part of the screen housing by small fluorescent tubes, as are used on a larger scale for illuminating rooms.

Since each pixel has three color filters for the colors of red, green and blue, the control of the transparency of these filters means that each pixel can assume a desired color mixture or a desired color.

For standard office applications, flat screens have outstanding sharpness and a sufficient color quality. In ergonomic terms, TFTs also have much to offer: smaller space requirement, a power consumption which is only a third of that of a tube monitor and significantly lower emission of radiation.

As is conventional in microelectronics, the production of TFT screens requires so-called ultra-clean rooms. This is necessary because, in view of the small size of the line-carrying structures, even small particles can cause line interruptions during the production process. In the production of a TFT screen, such a line interruption would result in the failure of a pixel.

A clean room, or an ultra-clean room, is a room in which the concentration of airborne particles is controlled. It is constructed and used in such a manner that the number of particles introduced into the room or produced and deposited in the room is as small as possible, and other parameters, such as temperature, humidity or air pressure, are controlled as required.

On the one hand, TFT screens are currently becoming less and less expensive, and on the other hand the demand for screens with enormous proportions is increasingly standing out, all the more so because screens of this type firstly can be used very easily at major events and secondly are available in affordable price ranges due to modern production technology.

However, the production of large screens requires the use of special machines even in ultra-clean rooms to handle the large-surface-area, thin glass plates required in this case.

For this purpose, it is possible to use primarily multi-axle industrial robots.

The use of a wide variety of embodiments of multi-axle industrial robots in technology for producing a wide variety of products can be gathered from the prior art. Industrial robots of this type are used in large halls mostly for transporting unmanageable and heavy loads, but can also be used beneficially in the production of smaller machine parts. What matters in all cases is the reproducible precision of the movement sequences of the individual grasping operations, transport movements and setting-down operations.

Here, the conditions in which these movement sequences take place are unimportant in many cases. For example, it is mostly immaterial which noise emission such a movement sequence causes, or whether such an operation is associated with the movement of dust or a more or less large escape of lubricant. Unavoidable abrasion of moving machine parts which cause friction is also mostly unremarkable.

By contrast, natural ramifications of this type must be taken into consideration when working in an environment at risk from contamination, for example in the food-processing industry, in the pharmaceutical industry or even in the production of semiconductors in ultra-clean rooms.

Thus, EP 1 541 296 A1 discloses a manipulator, such as an industrial robot, for use in an environment at risk from contamination, having a number of scavenging chambers, which can be charged with a scavenging medium, in the region of drive units of the manipulator. The object to be achieved in the case of such a device is to further develop the device to such an extent that the manipulator can safely be used in an environment at risk from contamination in a structurally simple manner and therefore, in particular, at low cost.

This object is achieved by a dedicated scavenging chamber being associated with each of a plurality groups of drive units (claim 1).

Although the environment in which such an industrial robot is to be used is more sensitive to contamination and therefore also places higher demands on the design configuration compared to a normal environment, special demands of this type cannot be compared with the conditions demanded in ultra-clean rooms.

Apart from what has been mentioned above, large, thin glass plates such as those used for producing large TFT screens are extremely sensitive to very small shocks owing to their crystalline structure and concurrent relatively large mass. Therefore, an industrial robot is also unsuitable for handling large, thin glass plates in ultra-clean rooms because it lacks sensitivity and in some cases may lack positional accuracy.

In ultra-clean room conditions, particular care and attention is required for the transfer of large, shock-sensitive glass plates from the horizontal orientation to a vertical orientation and likewise, after processing, the movement thereof into the horizontal position.

SUMMARY OF THE INVENTION

Therefore, the apparatus according to the invention and, respectively, the process according to the invention are based on the object of ensuring extremely accurate positioning in the transfer of large, thin glass plates in ultra-clean room conditions.

This object is achieved by an apparatus and by a process as described herein.

BRIEF DESCRIPTION OF THE DRAWINGS

The apparatus according to the invention is described in more detail below.

In detail.

DETAILED DESCRIPTION

Figure 1:
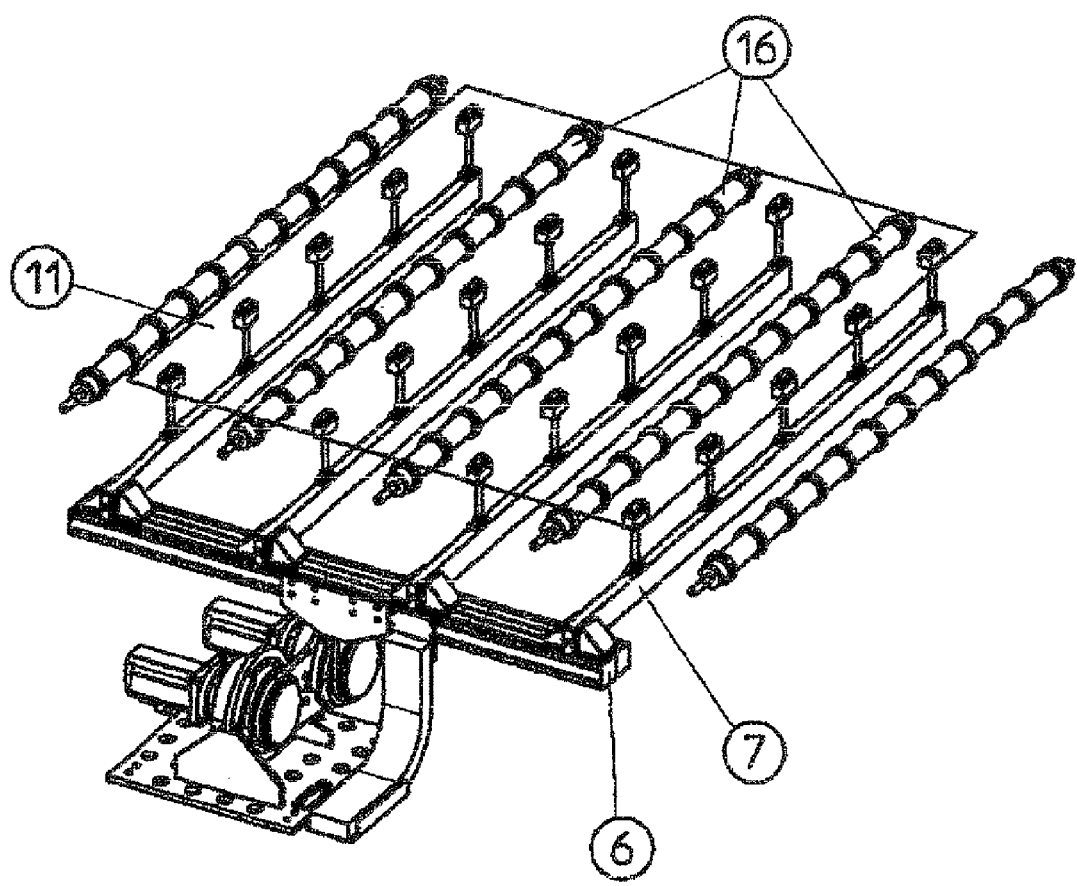
FIG. 1: is a spatial illustration of the transfer conditions.

In the perspective illustration of FIG. 1, it can be seen how the rollers (16), along which the glass plates (11) are guided horizontally on the transfer apparatus, have conveyed a glass plate (11) into the region of the transverse strut (6) of the transfer fork and the suction head support struts (7) connected thereto at right angles. The suction head support struts (7) run substantially parallel to the rollers (16). The precise positioning of the glass plate (11) can be monitored using line lasers or markings (not shown separately), the position of which is monitored using lasers and/or sensors.

A glass plate (11) can therefore be positioned with the greatest possible precision and fed for further processing in ultra-clean room conditions.

Figure 2:
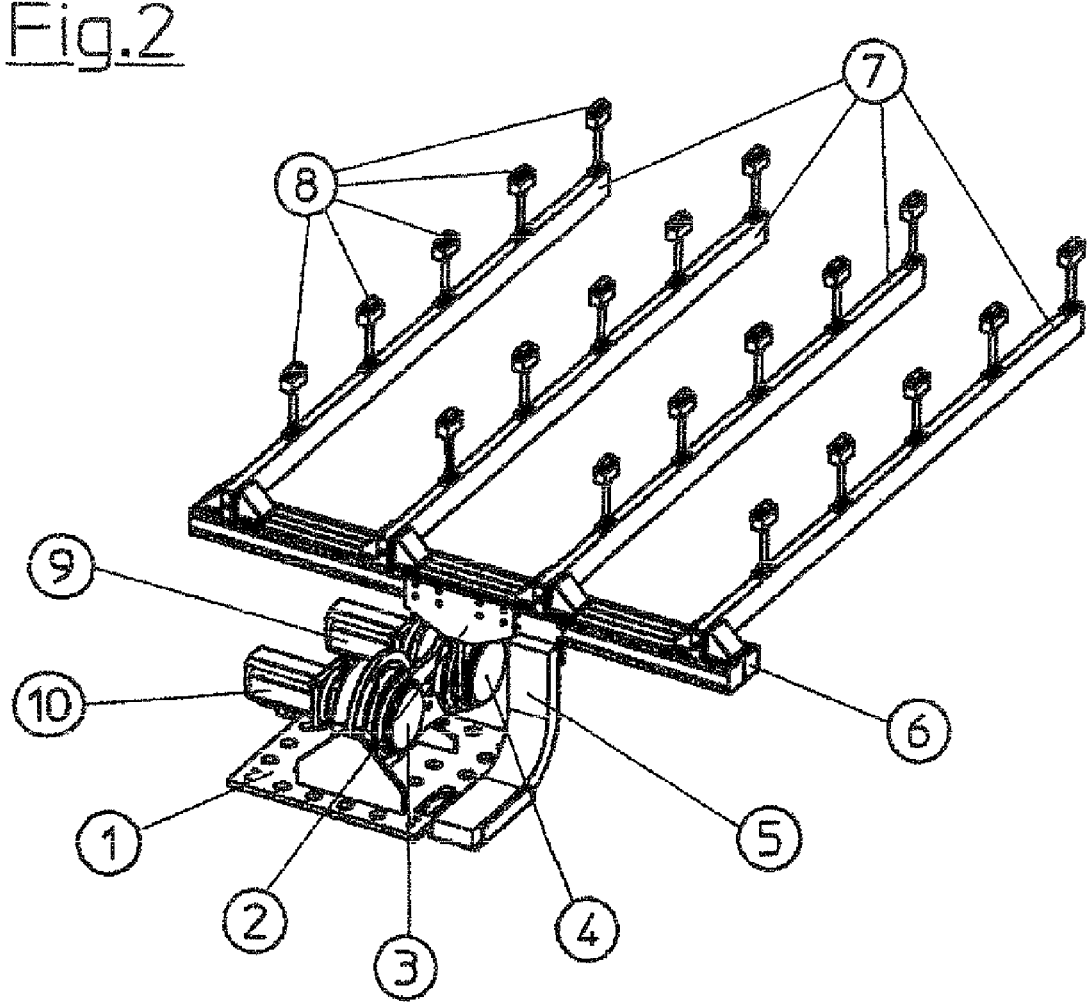
FIG. 2: is a spatial illustration of the transfer apparatus.

In FIG. 2, the transfer apparatus is shown from the same viewing direction, but without the rollers (16) being illustrated.

The transfer apparatus is anchored to the floor with the fastening plate (1). The transverse strut (6) of the transfer fork is mounted on the fastening plate (1) via the fastening element (2) and also the upper deflection gear mechanism (4) and the lower deflection gear mechanism (3) connected thereto via a crossbeam at a particular spacing.

Here, the upper deflection gear mechanism (4) is driven by the upper servo drive (9), and the lower deflection gear mechanism (3) is driven by the lower servo drive (10).

By way of example, four suction head support struts (7) each with five suction heads (8) are shown on the transverse strut (6) of the transfer fork.

Before the transfer operation, the suction heads (8) are attached fixedly to the relevant glass plate (11) by suction, and connect it to the transfer apparatus. The flexible service duct (5) is encapsulated in an emission-free manner and additionally has a dedicated suction extraction system All mechanically moving parts are encapsulated in an emission-free manner and can produce from abrasion-resistant material.

Figure 3:
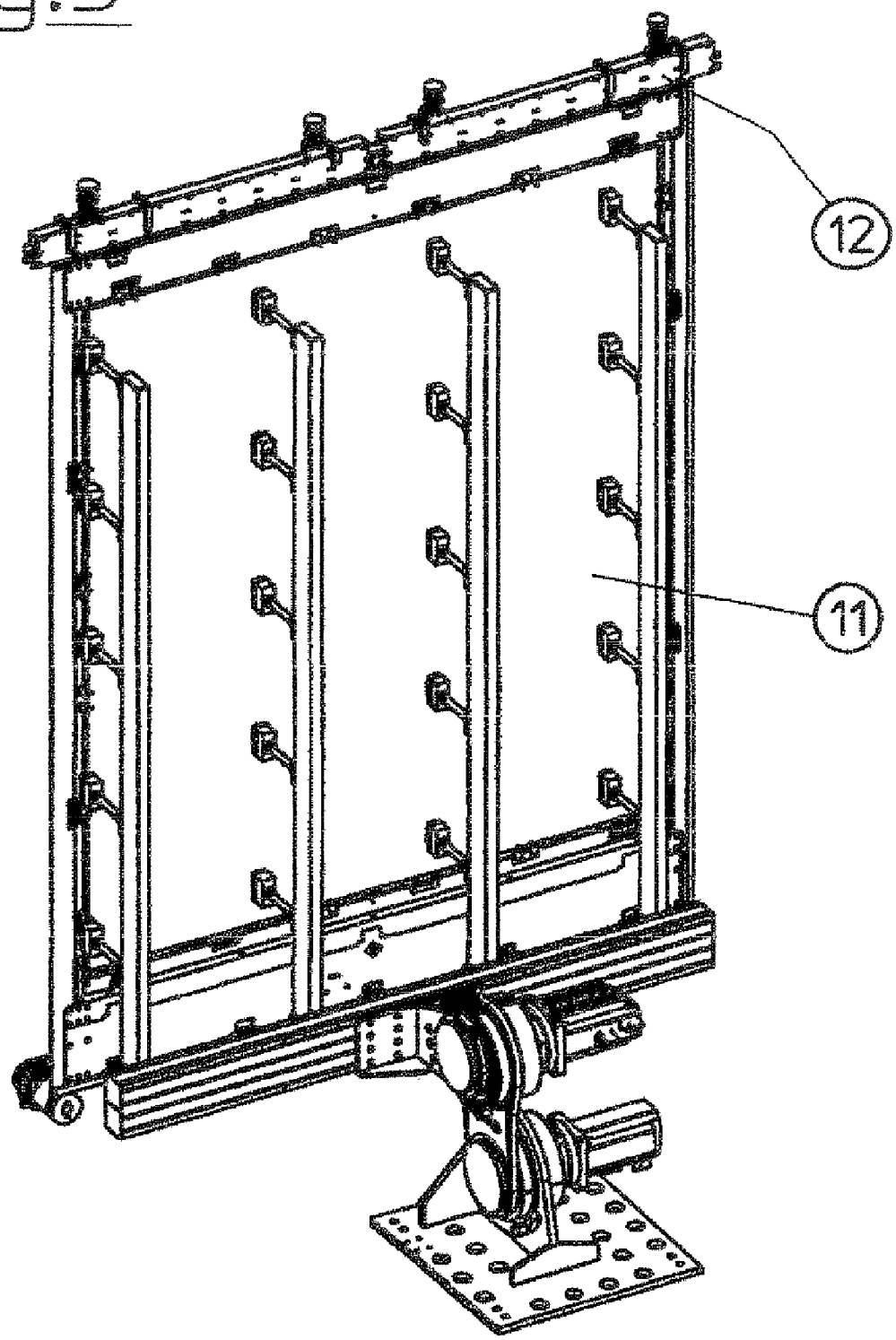
FIG. 3: is a spatial illustration of a transferred glass plate.

It can be seen in the perspective view in FIG. 3 how the glass plate (11), held by the suction heads (8), has been pivoted into an upright position in the region of a setting-down apparatus (12).

The actual pivoting operation from the horizontal position into the required vertical position is substantially carried out here using the lower deflection gear mechanism (3). A glass plate (11) can then be finely adjusted further both in the horizontal direction and in the vertical direction using the upper deflection gear mechanism (4).

A glass plate (11) then remains in the setting-down apparatus (12) until the coating operation according to the actual intended use.

For adaptation to different conditions in terms of the dimensions of the glass plates to be transferred and in terms of setting-down apparatuses of different dimensions, it can be provided that the crossbeam which connects the lower deflection gear mechanism (3) and the upper deflection gear mechanism (4) is configured in such a way that the distance between these two deflection gear mechanisms (3, 4) can be changed by motor. The current positions of the relevant system parts can be detected by control technology by sensors in order to be monitored on a screen. The comparative detection of positions of the system parts and positional data of glass plates (11) makes it possible to perform precise desired/actual comparisons and to achieve precise positioning results.

In order to provide a clear illustration, the corresponding system parts are not shown. Likewise, the apparatus according to the invention can be used to convey the glass plates (11), after they have been coated in the vertical position, back from the setting-down apparatus (12) to a horizontal position using a transfer apparatus, and to place said plates on a roller conveyor for the further production process. In this context, it should be noted that the metallic setting-down apparatus (12) is exposed to considerable temperature elevations during the processing of the glass plates (11), these temperature elevations causing thermal deformation of said apparatus (e.g. distorting said apparatus) and thus displacing the position of the glass plate (11). However, the laws according to which such displacement takes place are known in physical terms and can therefore be determined mathematically. Therefore, measurement of the temperature of the setting-down apparatus (12) can provide a remedy here, in so far as the resultant change in position of the glass plate (11) can be taken into account, as a known variable, in the transfer process and the subsequent processing.

Figure 4:
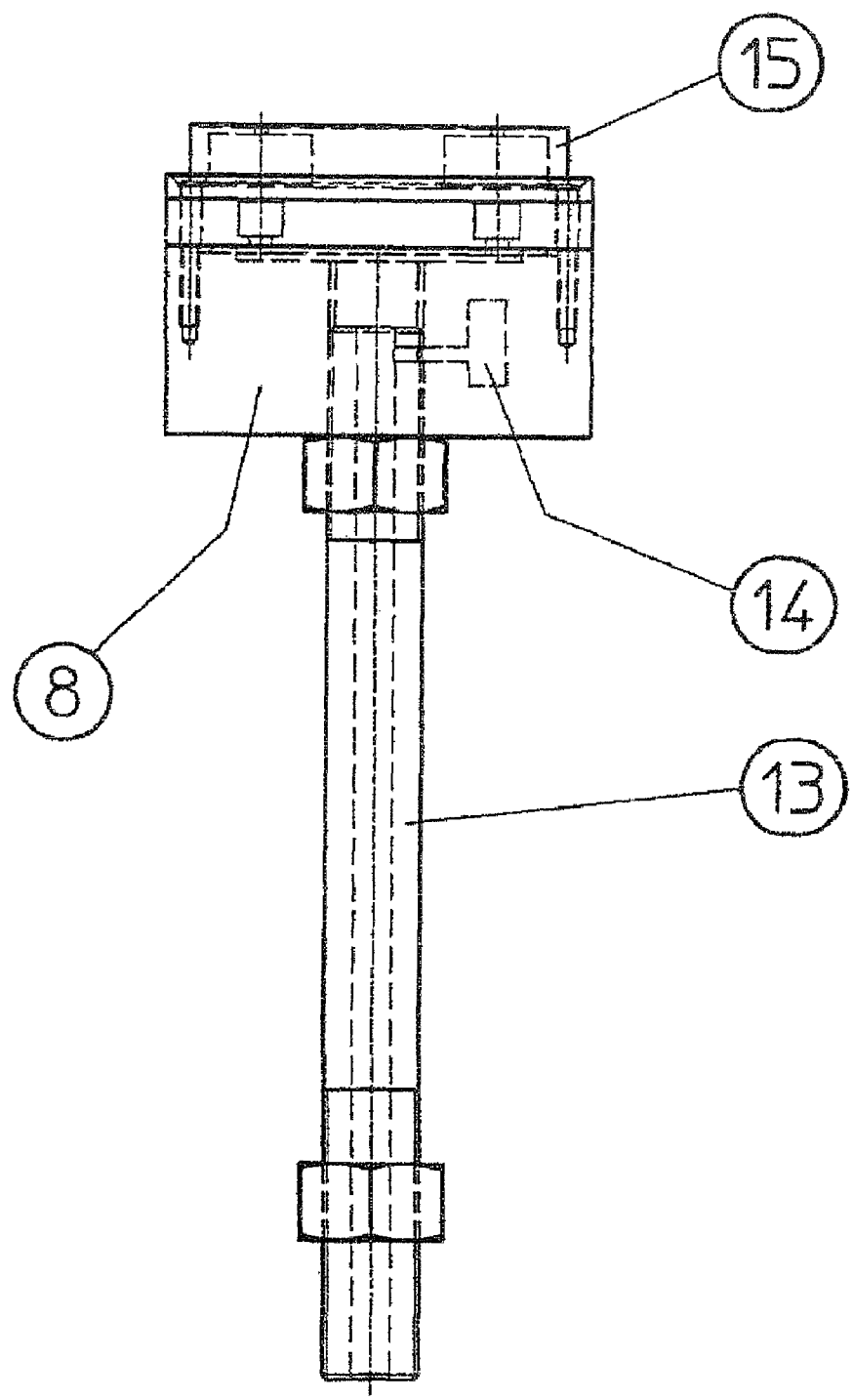
FIG. 4: is a sectional drawing of a suction head.

FIG. 4 illustrates a sectional drawing of a suction head (8).

The spacer bushing (13), at its lower end, bears a screw connection which is adapted to the ultra-clean room conditions. In the interior of the suction head (8), a flow sensor (14) can be seen, which detects the air flow flowing through the suction element (15) and forwards the measurement values determined by it in order to control the transfer apparatus.

The suction element (15) consists of a special high-performance material, known by the abbreviation PEEK.

The interactive control of the movement elements and sensors used in each case requires a special control program.

LIST OF REFERENCE NUMERALS (1) Base plate, fastening plate
(2) Fastening element of the transfer fork
(3) Lower deflection gear mechanism
(4) Upper deflection gear mechanism
(5) Secured, flexible service duct
(6) Transverse strut of the transfer fork
(7) Suction head support strut
(8) Suction head
(9) Upper servo drive
(10) Lower servo drive
(11) Glass plate
(12) Setting-down apparatus
(13) Spacer bushing for a suction head
(14) Flow sensor
(15) Suction element
(16) Roller

The invention claimed is:

1. An apparatus for the contamination-free transfer of thin, shock-sensitive crystalline plates from a horizontal position into a defined vertical position, said apparatus comprising:
   a) a plurality of horizontally extending rollers,
   b) a transfer fork with suction head support struts (7) fastened perpendicularly to the transfer fork, a top side of the struts (7) having suction heads (8) distributed over a length of the struts (7),
      wherein the suction heads (8) have suction elements (15) for the attraction by suction of a glass plate (11),
   c) a lower deflection gear mechanism (3) for pivoting the transfer fork between a horizontal position and a vertical position, wherein said suction head support struts pass through free space between said rollers when said transfer fork is pivoted between said horizontal position and said vertical position, and
   d) an upper deflection gear mechanism (4) for fine adjustment and for setting down a glass plate in a setting-down apparatus (12).

2. The apparatus as claimed in claim 1, wherein the deflection gear mechanisms (3, 4) are connected by a crossbeam.

3. The apparatus as claimed in claim 1, wherein the apparatus is also used to carry out a transfer from the vertical position into a horizontal position.

4. The apparatus as claimed in claim 1, wherein the suction elements (15) are produced from PEEK plastic.

5. The apparatus as claimed in claim 1, wherein mechanically moving parts are encapsulated in an emission-free manner and are produced from abrasion-resistant material.

6. The apparatus as claimed in claim 1, wherein thermal deformation of the setting-down apparatus (12) is detected and taken into account when transferring a glass plate (11) to the setting-down apparatus.

7. The apparatus of claim 1, wherein the suction head support struts are substantially parallel to said rollers.

* * * * *